(12) United States Patent
Layton et al.

(10) Patent No.: US 9,785,529 B2
(45) Date of Patent: Oct. 10, 2017

(54) LOST COMPUTING RESOURCE NOTIFICATION

(75) Inventors: Jeffrey T. Layton, Raleigh, NC (US); Eric L. Paris, Raleigh, NC (US); Neil R. T. Horman, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 943 days.

(21) Appl. No.: 12/713,688

(22) Filed: Feb. 26, 2010

(65) Prior Publication Data

US 2011/0213874 A1 Sep. 1, 2011

(51) Int. Cl.
*G06F 15/16* (2006.01)
*G06F 11/30* (2006.01)
*G06F 11/07* (2006.01)

(52) U.S. Cl.
CPC ...... *G06F 11/3006* (2013.01); *G06F 11/0709* (2013.01); *G06F 11/0787* (2013.01); *G06F 11/3055* (2013.01); *G06F 11/3065* (2013.01)

(58) Field of Classification Search
CPC ........... G06F 17/30171; G06F 11/3006; G06F 11/0709; G06F 11/3065; G06F 11/3055
USPC .................................................. 709/223, 224
See application file for complete search history.

(56) References Cited

U.S. PATENT DOCUMENTS

| 5,226,159 A | * | 7/1993 | Henson ............. G06F 17/30171 |
| 5,537,645 A | * | 7/1996 | Henson et al. ................ 709/203 |
| 5,594,863 A | * | 1/1997 | Stiles .............................. 714/15 |
| 6,775,703 B1 | * | 8/2004 | Burns ................. G06F 12/0866 709/223 |
| 7,258,498 B2 | * | 8/2007 | Hatta et al. ...................... 400/62 |
| 7,284,061 B2 | * | 10/2007 | Matsubayashi et al. ..... 709/229 |
| 7,343,432 B1 | * | 3/2008 | Niver et al. ..................... 710/36 |
| 7,873,619 B1 | * | 1/2011 | Faibish et al. ................ 707/705 |
| 2004/0068563 A1 | * | 4/2004 | Ahuja et al. .................. 709/225 |
| 2004/0220931 A1 | * | 11/2004 | Guthridge .......... G06F 17/30171 |
| 2006/0136926 A1 | * | 6/2006 | Goldick ........................ 718/104 |
| 2010/0017409 A1 | * | 1/2010 | Rawat et al. ..................... 707/8 |
| 2011/0179168 A1 | * | 7/2011 | Nylander .............. H04L 63/101 709/225 |

OTHER PUBLICATIONS

Burrows, Mike. "The Chubby lock service for loosely-coupled distributed systems". Google. OSDI 2006. p. 335-350.*
"SIGLOST", accessed at: http://en.wikipedia.org/wiki/SIGLOST on Feb. 26, 2010, last updated Dec. 17, 2009, 1 page.

* cited by examiner

*Primary Examiner* — John Macilwinen
(74) *Attorney, Agent, or Firm* — Lowenstein Sandler LLP

(57) ABSTRACT

Some embodiments of a system and a method to notify applications of lost computing resources have been presented. For instance, a processing device running on a client machine can monitor a computing resource used by an application, which also runs on the client machine. If the computing resource is lost, then the processing device can notify the application of the loss and provides details about the lost computing resource to the application so that the application can take appropriate action in response to the loss.

21 Claims, 4 Drawing Sheets

LOST COMPUTING RESOURCE NOTIFICATION

TECHNICAL FIELD

Embodiments of the present invention relate to computer applications, and more specifically to notifying computer applications of lost computing resources.

BACKGROUND

Today, many networked computing systems are widely deployed to allow client machines to use remote computing resources. For example, a company may provide a networked file system to allow employees of the company to access or use data stored remotely.

Conventionally, applications running on a client machine can get exclusive access or usage of some networked computing resources by placing a lock on the remote computing resources. For example, an application running on a client machine may place a lock on a file stored remotely on a server. Then other applications, which may run on the client machine or on another client machine, cannot use the file. Thus, the application having the lock on the file does not have to worry about the file being changed by another application while the application is using the file. Furthermore, the application can ensure that update of the file is completed before other applications can use the file.

However, the lock may be lost under certain circumstances, such as loss of network connectivity between the client machine and the server, the server being rebooted, etc. When a lock is lost, a conventional client machine typically informs the application that some computing resources have been lost. For example, in some conventional UNIX-like platforms, a kernel running on the client machine sends a signal SIGLOST to an application when a file lock used by the application is lost. When the application receives the signal SIGLOST, the application becomes aware that something is lost. But the application cannot tell from the signal SIGLOST what is lost because the signal SIGLOST provides no information about the lost file lock.

BRIEF DESCRIPTION OF THE DRAWINGS

The present invention is illustrated by way of example, and not by way of limitation, in the figures of the accompanying drawings and in which.

DETAILED DESCRIPTION

Figure 1:
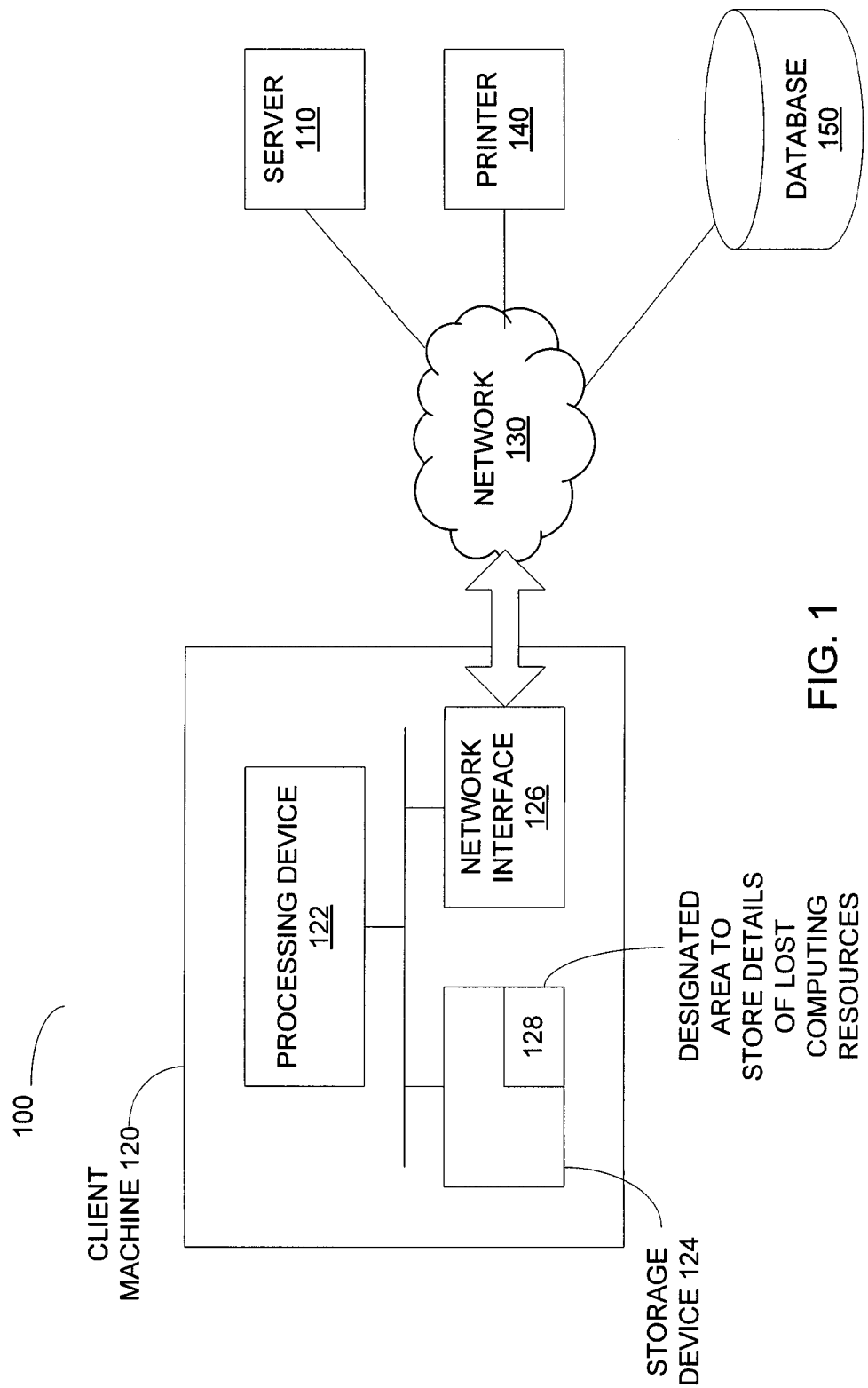
FIG. 1 illustrates one embodiment of a computing system usable in some embodiments of the invention.

Described herein are some embodiments of a method, an apparatus, and a system to notify applications of lost computing resources. In some embodiments, a processing device running on a client machine can monitor a computing resource used by an application, which also runs on the client machine. If the computing resource is lost, then the processing device can notify the application of the loss and provides details about the lost computing resource to the application so that the application can take appropriate action in response to the loss. More details of some embodiments of how to notify applications of lost computing resources are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "monitoring" or "notifying" or "providing" or "writing" or "executing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

Figure 4:
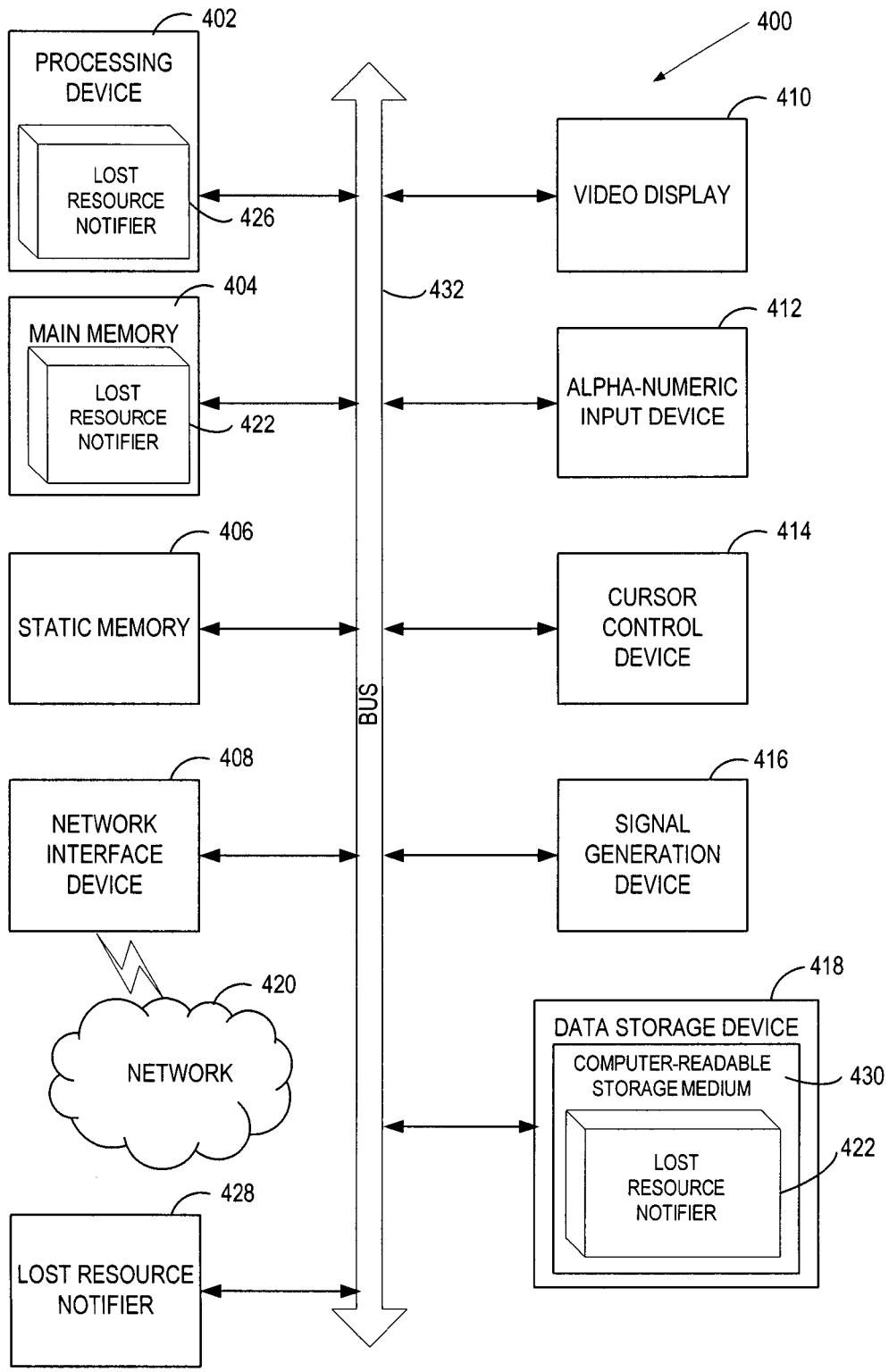
FIG. 4 illustrates a block diagram of an exemplary computing system.

FIG. 1 illustrates one embodiment of a computing system usable in some embodiments of the invention. The computing system 100 includes a server 110, a client machine 120, a printer 140, and a database 150, coupled to each other via a network 130. The network 130 may include various types of network, such as, for example, a public network (e.g., the Internet), a private network (e.g., a local area network), a wireless network, a wire-lined network, etc. The server 110 and the client machine 120 may be implemented on one or more computing machines, such as a desktop personal computer, a laptop computer, a personal digital assistant, a smart phone, etc. Details of one example of a computing machine are illustrated in FIG. 4. The database 150 is stored in one or more machine-readable storage media, such as, optical disks, CD-ROMs, and magnetic-optical disks, magnetic or optical cards, magnetic tapes, or any type of media suitable for storing electronic data.

In some embodiments, the client machine 120 includes a processing device 122, a storage device 124, and a network interface 126, coupled to each other. The processing device 122 is operable to execute applications. One or more of the applications running on the processing device 122 may use remote computing resources, which may include hardware, software, data, or a combination of any of the above. Some examples of computing resources include the printer 140, the database 150, data hosted by the server 110, and/or processing power of the server 110, etc. Furthermore, an application may have exclusive access or usage of a computing resource during a particular period of time. For example, an application may place a file lock (or simply referred to as a lock) on a file hosted by the server 110 such that other applications, either running on the client machine 120 or on another client machine (not shown), cannot access the file. The network interface 126 is usable to access the remote computing resources via the network 130. The storage device 124 may include one or more machine-readable storage media, such as, RAM, EPROM, EEPROM, etc. Furthermore, an area 128 within the storage device 124 is designated for storing, at least temporarily, information about lost computing resources. To further explain the operations of the client machine 120, some examples are discussed in details below.

In one example, an application running on the processing device 122 of the client machine 120 wants to hold a lock on a file hosted by the server 110. Thus, the processing device 122 takes out a file lock on the file. Subsequently, the file lock may be lost for various reasons, such as, for example, the server 110 may have been rebooted, network connectivity to the server 110 may have been lost, etc. In some embodiments, the server 110 notifies the client machine 120 about the loss. Then the client machine 120 is responsible for reclaiming the lock within a predetermined grace period. If not reclaimed, another client machine may take the lock and, the client machine 120 will be aware that it no longer has the lock. Alternatively, the client machine 120 is expected to periodically confirm with the server 110 that it still has this lock. If the client machine 120 fails to periodically confirm with the server 110 because, for instance, network connectivity has been lost for a while, then the client machine 120 may lose the lock. When the lock is lost, the processing device 122 of the client machine 120 notifies the application running on the processing device 122 of the lost file lock. The processing device 122 may send a specific signal to the application, or write in the designated area 128 of the storage device 124 in order to notify the application of the lost file lock.

In some embodiments, the processing device 122 further puts detailed information about the lost file lock in the designated area 128 of the storage device 124, and then the application can read the designated area 128 to find out details about the loss, such as the time at which the lock has been lost, the network address of the file previously locked, etc. Unlike some conventional approach, in which only a signal (e.g., SIGLOST) is sent to the application to inform the application that a loss has occurred, the application is provided with detailed information about the loss such that the application may take appropriate action to remedy the situation or to mitigate the loss based on the information. For example, the application may try to reacquire the computing resource lost, verify that there is no data corruption due to loss of synchronization, etc. To further explain the above technique, a functional block diagram of one embodiment of the client machine 120 is shown in FIG. 2.

Figure 2:
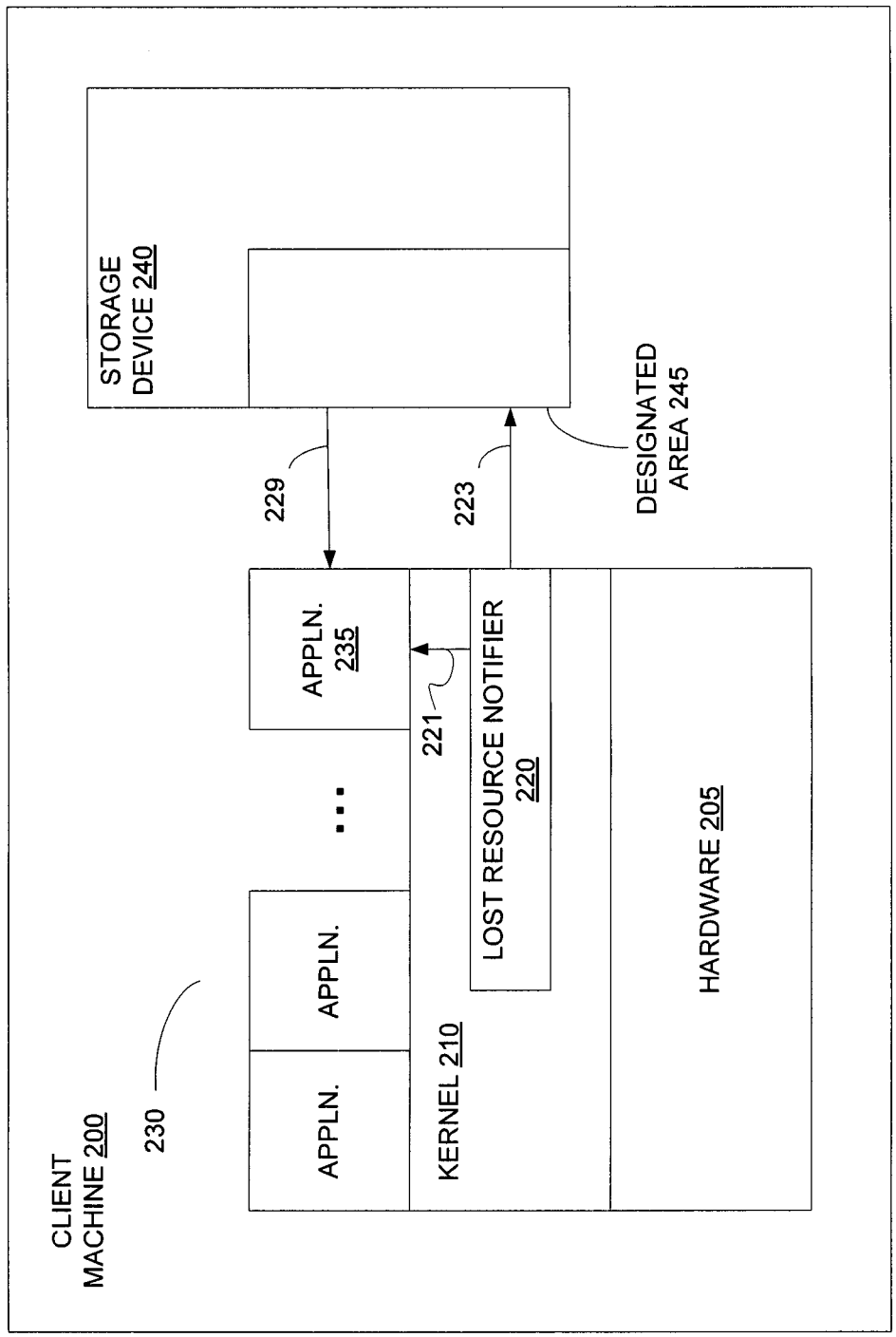
FIG. 2 illustrates one embodiment of a client machine.

FIG. 2 illustrates one embodiment of a client machine. The client machine 200 includes a kernel 210 and hardware 205 (e.g., the processing device 122 and the network interface 126 in FIG. 1). A set of one or more applications 230 runs on the kernel 210. The kernel 210 acts as an interface between the hardware 205 and the applications 230 by managing usage of the hardware 205 by the applications 230. In some embodiments, the kernel 210 further includes a lost resource notifier 220 to monitor remote computing resources used by the applications 230 and to report loss of the computing resources, if any.

In some embodiments, an application 235 wants to lock some computing resources, such as a file on a remote server, a printer, a database, etc. In the current example, suppose the application 235 wants to lock a file hosted by a server over a network (e.g., the server 110 in FIG. 1). The application 235 may instruct the kernel 210 to lock the file. The kernel 210 may send a message or an instruction to the server hosting the file to lock the file on behalf of the application 235.

In order to detect the loss, the lost resource notifier 220 may monitor the computing resource, the entity associated with the computing resource held, and the entity that contains the entity on which the computing resource is held. For instance, referring back to the above example, the lost resource notifier 220 may monitor the file lock, the file on which the lock is held, and the directory containing the file on which the lock is held. After placing the lock, the computing resource may be lost for various reasons (e.g., the server is rebooted, network connectivity is lost, etc.).

When the computing resource is lost, then the lost resource notifier 220 may notify the application 235 with information on the computing resource lost. The lost resource notifier 220 may notify the application 235 synchronously or asynchronously. Referring back to the above example, the server may inform the lost resource notifier 220 when the file lock is lost. Alternatively, the lost resource notifier 220 may find out about the loss itself. For example, the kernel 210 may fail to periodically confirm the file lock with the server, and thus, the lock is subsequently lost. The lost resource notifier 220 keeping a watch on the file lock can become aware that the kernel 210 fails to confirm periodically with the server and as a result, the file lock has been lost. The lost resource notifier 220 may send a signal 221 to the application 235 to tell the application 235 that a loss has occurred. Alternatively, the lost resource notifier 220 may tell the application 235 about the loss by writing in a designated area 245 of a storage device 240 within the client machine 200. For instance, the lost resource notifier 220 may set a bit in the designated area 245 to indicate a particular file lock has been lost. The application 235 can read that area 245 to determine that the file lock is lost.

The lost resource notifier 220 can further put information 223 about the loss in the designated area 245, and then the application 235 can read information 229 from that area 245 to find out details of the file lock lost. For example, the lost resource notifier 220 may write the name of the file lock, the name of the file, the directory containing the file, the time at which the loss has occurred, etc. in the designated area 245. Based on the details of the file lock lost, the application 235 can take appropriate action to remedy or mitigate the loss. For example, the application 235 may try to re-acquire the file lock, verify that there is no data corruption due to loss of synchronization, etc.

Figure 3:
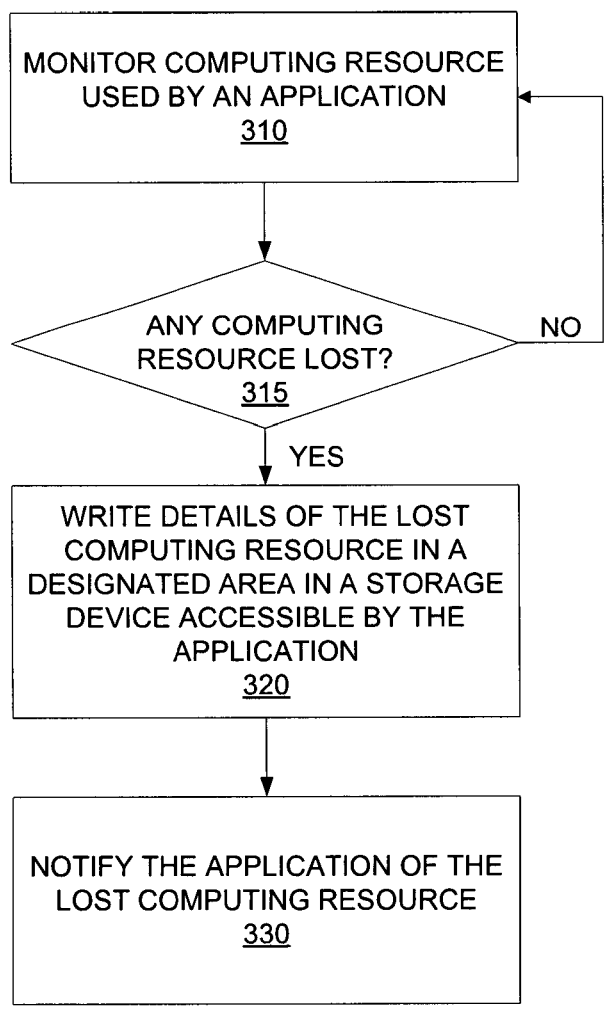
FIG. 3 illustrates a flow diagram of one embodiment of a method to notify applications of lost computing resources.

FIG. 3 illustrates a flow diagram of one embodiment of a method to notify applications of lost computing resources. The method may be performed by processing logic that may comprise hardware (e.g., circuitry, dedicated logic, programmable logic, microcode, etc.), software (such as instructions run on a processing device), firmware, or a combination thereof. For instance, the client machine 200 illustrated in FIG. 2 may perform at least part of the method in some embodiments.

Initially, processing logic monitors computing resource used by an application running on a client machine (processing block 310). In some embodiments, the application has exclusive access and usage of the computing resource, which may include a file, a printer, a database, etc. Processing logic checks if the computing resource is lost (processing block 315). If no computing resource is lost, processing logic returns to processing block 310 to continue monitoring the computing resources. The computing resource may be lost for many different reasons, such as, for example, network connectivity to the computing resource is lost, the computing resource is down (e.g., a printer is down), a machine (e.g., a server, a storage device, etc.) hosting the computing resource is down or reboot, etc. In some embodiments, processing logic may attempt to re-claim the computing resource lost. For example, the computing resource may be a file lock and processing logic may try to lock the file again. If the computing resource is re-claimed successfully, then processing logic may return to processing block 310 to continue monitoring the computing resource.

If the computing resource is lost and cannot be successfully re-claimed, then processing logic writes details of the loss in a designated area of a storage device within the client machine (processing block 320). Then processing logic further notifies the application of the loss (processing block 330). The application can access the storage device to read the details from the designated area. The details may include information on the computing resource lost (e.g., file name, directory containing the file, etc.), the time at which the loss is detected, the reason that caused the loss, etc. Based on the details, the application may take appropriate action to remedy the situation or to mitigate the loss. For example, the application may verify if there is any data corruption due to the loss of synchronization. In another example, the application may try to re-claim the computing resource.

FIG. 4 illustrates a diagrammatic representation of a machine in the exemplary form of a computing system 400 within which a set of instructions, for causing the machine to perform any one or more of the methodologies discussed herein, may be executed. In alternate embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computing system 400 includes a processing device 402, a main memory 404 (e.g., read-only memory (ROM), flash memory, dynamic random access memory (DRAM) such as synchronous DRAM (SDRAM), a static memory 406 (e.g., flash memory, static random access memory (SRAM), etc.), and a data storage device 418, which communicate with each other via a bus 432.

Processing device 402 represents one or more general-purpose processing devices such as a microprocessing device, a central processing unit, or the like. More particularly, the processing device may be complex instruction set computing (CISC) microprocessing device, reduced instruction set computing (RISC) microprocessing device, very long instruction word (VLIW) microprocessing device, or processing device implementing other instruction sets, or processing devices implementing a combination of instruction sets. Processing device 402 may also be one or more special-purpose processing devices such as an application specific integrated circuit (ASIC), a field programmable gate array (FPGA), a digital signal processing device (DSP), network processing device, or the like. The processing device 402 is configured to execute the lost resource notifier 426 for performing the operations and steps discussed herein.

The computing system 400 may further include a network interface device 408. The computing system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a computer-accessible storage medium 430 (also known as a computer-readable storage medium) on which is stored one or more sets of instructions (e.g., lost resource notifier 422) embodying any one or more of the methodologies or functions described herein. The lost resource notifier 422 may also reside, completely or at least partially, within the main memory 404 and/or within the processing device 402 during execution thereof by the computing system 400, the main memory 404 and the processing device 402 also constituting computer-accessible storage media. The lost resource notifier 422 may further be transmitted or received over a network 420 via the network interface device 408.

While the computer-readable storage medium 430 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical and magnetic media, etc.

The lost resource notifier 428, components and other features described herein (for example, in relation to FIG. 2) can be implemented as discrete hardware components or integrated into the functionalities of hardware components, such as ASICS, FPGAs, DSPs, or similar devices. In addition, the lost resource notifier 428 can be implemented as firmware or functional circuitries within hardware devices. Further, the lost resource notifier 428 can be implemented in any combination of hardware devices and software components.

Thus, some embodiments of a system and a method to notify applications of lost computing resources have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   monitoring, by a processing device of a client machine, a computing resource comprising a lock associated with the client machine;
   determining, by the processing device, whether the lock associated with the client machine is inaccessible to the client machine;
   writing, by the processing device, details related to the lock being inaccessible to the client machine in a designated area of a storage device within the client machine, wherein the designated area of the storage device is accessible by an application running on the client machine that retrieves the details; and
   determining, by the processing device, that the client machine has not reclaimed the lock within a threshold period, wherein the lock associated with the client machine is made available to a second client machine in response to determining that the lock associated with the client machine is not reclaimed by the client machine within the threshold period.

2. The method of claim 1, wherein the monitoring the computing resource comprises:
   monitoring, by the processing device, the lock, a file on which the lock is held, and a directory that contains the file.

3. The method of claim 1, wherein the computing resource comprises use of a networked printer coupled to the client machine, and monitoring the computing resource comprises:
   monitoring, by the processing device, network connectivity between the client machine and the networked printer, and status of the networked printer.

4. The method of claim 1, wherein the details related to the lock being inaccessible to the client machine comprise a name of the computing resource, a network address of the computing resource, a time at which the lock associated with the client machine is not accessible to the client machine, and a reason why the lock is inaccessible to the client machine.

5. The method of claim 1, further comprising notifying, by the processing device, the application that the lock associated with the client machine is inaccessible to the client machine, wherein notifying the application causes the application to retrieve the details from the designated area.

6. The method of claim 5, wherein the notifying the application of the lock associated with the client machine being inaccessible to the client machine is one of synchronously and asynchronously.

7. The method of claim 1 wherein the application running on the client machine uses the computing resource.

8. An apparatus comprising:
   a memory; and
   a processing device, operatively coupled to the memory, to:
      monitor a computing resource comprising a lock associated with the client machine,
      determine whether the lock associated with the client machine is inaccessible to the client machine;
      writing, by the processing device, details related to the lock being inaccessible to the client machine in a designated area of a storage device within the client machine, wherein the designated area of the storage device is accessible by an application running on the client machine that retrieves the details; and
      determine that the client machine has not reclaimed the lock within a threshold period, wherein the lock associated with the client machine is made available to a second client machine in response to determining that the lock associated with the client machine is not reclaimed by the client machine within the threshold period.

9. The apparatus of claim 8, wherein the processing device is to monitor the lock, a file on which the lock is held, and a directory that contains the file.

10. The apparatus of claim 8, wherein the computing resource comprises use of a networked printer coupled to the client machine, and the processing device is to monitor network connectivity between the client machine and the networked printer, and status of the networked printer.

11. The apparatus of claim 8, wherein the details related to the lock being inaccessible to the client machine comprise a name of the computing resource, a network address of the computing resource, a time at which the lock associated with the client machine is not accessible to the client machine, and a reason why the lock is inaccessible to the client machine.

12. The apparatus of claim 8, wherein the processing device is to notify the application that the lock associated with the client machine is inaccessible to the client machine, wherein notifying the application causes the application to retrieve the details from the designated area.

13. The apparatus of claim 12, wherein the processing device is to notify the application that the lock associated with the client machine is inaccessible to the client machine is one of synchronously and asynchronously.

14. The apparatus of claim 8 wherein the processing device is to execute the application that uses the computing resource.

15. A non-transitory computer-readable storage medium embodying instructions that, when executed by a processing device, will cause the processing device to:
   monitor a computing resource comprising a lock associated with the client machine;
   determine, by the processing device, whether the lock associated with the client machine is inaccessible to the client machine;
   write, by the processing device, details related to the lock being inaccessible to the client machine in a designated area of a storage device within the client machine, wherein the designated area of the storage device is accessible by an application running on the client machine that retrieves the details; and
   determine, by the processing device, that the client machine has not reclaimed the lock within a threshold period, wherein the lock associated with the client machine is made available to a second client machine in response to determining that the lock associated with the client machine is not reclaimed by the client machine within the threshold period.

16. The non-transitory computer-readable storage medium of claim 15, wherein to monitor the computing resource, the processor is to:
monitor the lock, a file on which the lock is held, and a directory that contains the file.

17. The non-transitory computer-readable storage medium of claim 15, wherein the computing resource comprises use of a networked printer coupled to the client machine, and to monitor the computing resource, the processor is to:
monitor network connectivity between the client machine and the networked printer, and status of the networked printer.

18. The non-transitory computer-readable storage medium of claim 15, wherein the details related to the lock being inaccessible to the client machine comprise a name of the computing resource, a network address of the computing resource, a time at which the lock associated with the client machine is not accessible to the client machine, and a reason why the lock is inaccessible to the client machine.

19. The non-transitory computer-readable storage medium of claim 15, the processing device is to notify the application that the lock associated with the client machine is inaccessible to the client machine, wherein notifying the application causes the application to retrieve the details from the designated area.

20. The non-transitory computer-readable storage medium of claim 19, wherein the processing device is to notify the application that the lock associated with the client machine is inaccessible to the client machine is one of the synchronously and asynchronously.

21. The non-transitory computer-readable storage medium of claim 15 wherein the application running on the client machine uses the computing resource.

* * * * *